United States Patent Office 3,826,655
Patented July 30, 1974

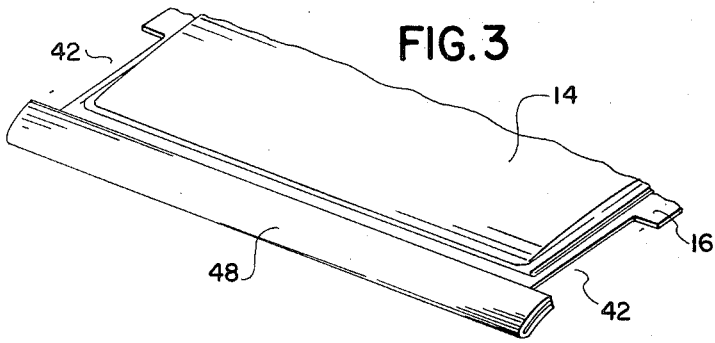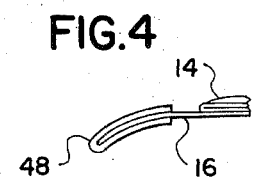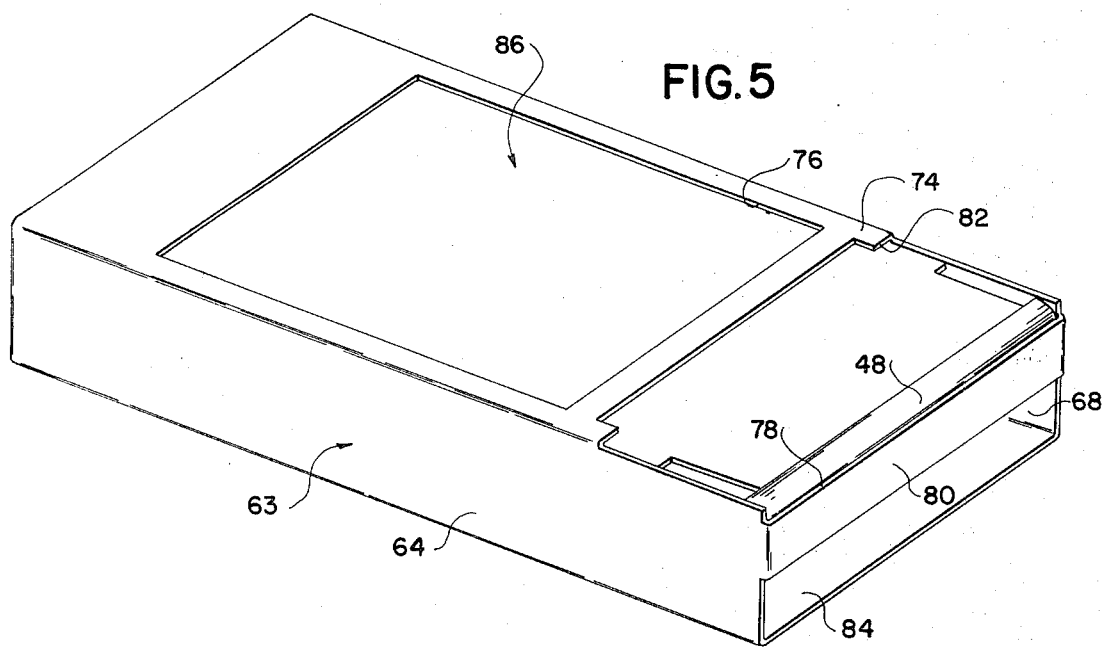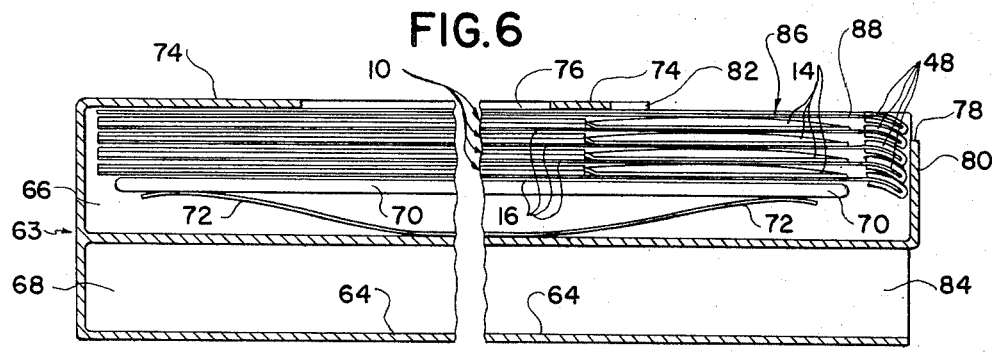

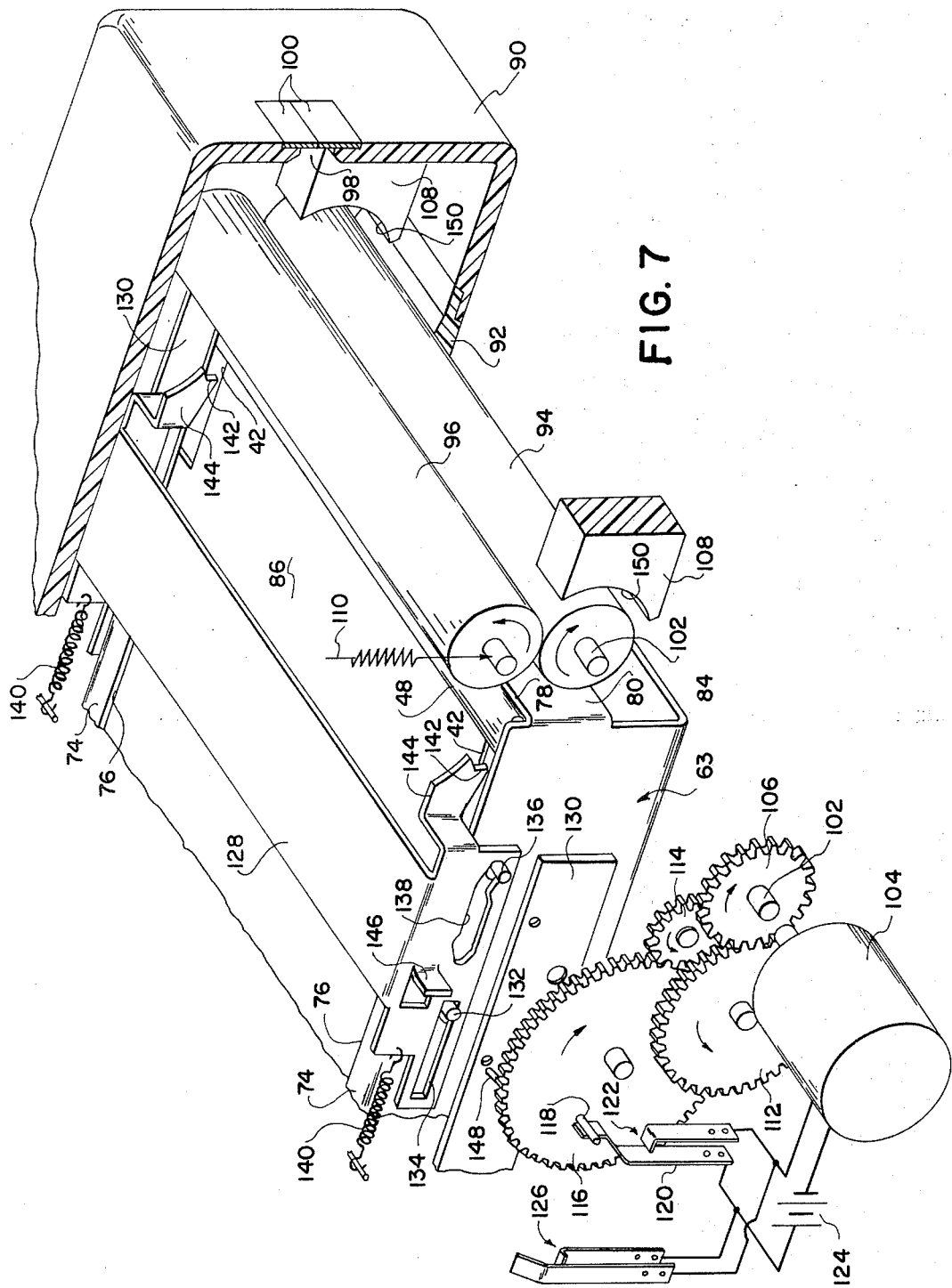

3,826,655
PHOTOGRAPHIC FILM HANDLING
IMPROVEMENT
Robert J. Borel, Webster, James C. Foote, Jr., York, and
Horace G. Warren, Hilton, N.Y., assignors to Eastman
Kodak Company, Rochester, N.Y.
Filed July 10, 1972, Ser. No. 270,407
Int. Cl. G03c 1/48
U.S. Cl. 96—76 R
9 Claims

ABSTRACT OF THE DISCLOSURE

A self-processing film unit is provided with improved means for facilitating its handling in a processing camera and for permitting its use with simplified camera mechanisms. The film unit includes a first part, such as processing materials, and a second part, such as an image-recording section, that are releasably coupled together. Processing is initiated by endwise movement of the film unit between a pair of pressure-applying members and the first and second parts then are separated by diverting the first part into an arcuate path extending partially around one of the pressure-applying members while permitting movement of the second part in a straight line path extending beyond the pressure-applying members. The leading end of the first part is provided with a diverter, such as a transverse bar, that is profiled to divert it rearwardly around the one member and into engagement with appropriate guide means, without requiring that any part of the film unit be wider than the second or image-recording part.

BACKGROUND OF THE INVENTION

The present invention relates to film units of the self-processing type, and more particularly to improved means for facilitating the handling of such film units, and/or parts thereof, in processing cameras and related photographic apparatus.

Great strides have been made in recent years in the art of self-processing photography. Film units and cameras have been developed that eliminate or substantially alleviate many of the disadvantages associated with older self-processing systems. Processing waste materials have been reduced significantly, and mechanisms have been provided that collect what remains in a form that greatly facilitates its proper disposal without harm to the environment.

An important part of this recent progress is represented by the inventions in film units and apparatus, such as processing cameras, that are illustrated and described in commonly assigned U.S. Patent Applications Ser. Nos. 111,467 entitled Photographic Apparatus, and 111,471 entitled Film Unit, both filed on Feb. 1, 1971 in the name of Donald M. Harvey and both now abandoned; and in commonly assigned U.S. Patent Applications Ser. Nos. 268,940 entitled Film Handling Improvement, 268,932 entitled Photographic Film Unit, and 268,936 entitled Translatable Stripping and Guiding Mechanism, all filed on July 5, 1972 in the name of Donald M. Harvey. As there presented, the film units generally include an image-recording section, and processing materials that are especially adapted to be separated and collected, after the initiation of processing, by improved and reliable camera mechanisms. In operation, the mechanisms deflect the used processing materials into a first preferably arcuate path extending toward a waste collecting chamber, while the image-recording section is permitted to move, or is directed, along a second preferably straight-line path that effects its separation from the processing materials. In the first-mentioned applications, the deflecting mechanisms are disclosed as including a pair of spaced deflecting fenders located to be engaged by a widest portion of the film unit, for deflecting the processing materials into the first path, while the narrower image-recording section is permitted to move between the fenders along the second path. As disclosed in the last-mentioned application, the deflecting mechanism includes an element that is translatable between a first position, for deflecting the processing materials into the first path, and a second position, for permitting or even compelling movement of the image-recording section along the second path. In that case the film unit does not include any portion that is wider than the image-recording section.

Film units and cameras of the above-mentioned types provide many significant advantages not obtainable with previously known structures. The present applicants have found, however, that they can realize additional important advantages in accordance with the present invention, while still retaining or even further utilizing and improving on the advantageous features presented in the above-mentioned applications.

SUMMARY OF THE INVENTION

In accordance with the present invention, a self-processing film unit is provided with means for diverting the film unit, or portions thereof, from a first path extending generally tangential to a pair of juxtaposed pressure-applying members, into a second path extending at least partly around one of the members. In accordance with one feature, the film unit includes a first part, such as the processing materials, and a second part, such as the image-recording section, that are separable after the initiation of processing. In such case, the diverter moves the first part into a path that effects its separation from the second part. In accordance with other features of the invention, certain camera structures, such as the previously mentioned deflecting fenders or elements, can be eliminated, or at least simplified, while still retaining the camera operations otherwise accomplished by the eliminated or simplified structure.

These and other objects are achieved in accordance with a preferred embodiment of the invention by providing the film unit with a diverting element or bar that is profiled to divert the leading end of the film unit around one of the pressure-applying members as it passes between the members. The bar diverts the leading end into engagement with one or more guide members that direct one part of the film unit, such as the then exhausted container, toward a storage compartment, while separating the one part from another part of the film unit, such as the image-recording section. As will become more apparent hereinafter, no part of the film unit need be wider than the image-recording section, and the diverting element profile can also be used to increase the stiffness of the leading end of the film unit.

Various means of practicing the invention and other advantages and novel features thereof will be apparent from the following detailed description of illustrative embodiments of the invention, reference being made to the accompanying drawings in which like reference characters denote like elements.

BRIEF DESCRIPTION OF THE DRAWINGS

In the drawings:
FIG. 3 is an enlarged perspective view of the leading end portion of the film unit shown in FIGS. 1 and 2;

FIG. 4 is a side elevational view of the diverter bar shown in FIGS. 1–3.

FIG. 5 is a perspective view of a film pack containing a plurality of film units of the type illustrated in FIGS. 1–4;

FIG. 6 is a cross-sectional side view of the film pack shown in FIG. 5;

FIG. 7 is a perspective view showing the relation of the film pack to the basic components of the film processing mechanism of a camera in which the film pack is installed;

DESCRIPTION OF THE ILLUSTRATIVE PREFERRED EMBODIMENTS

Figure 1:
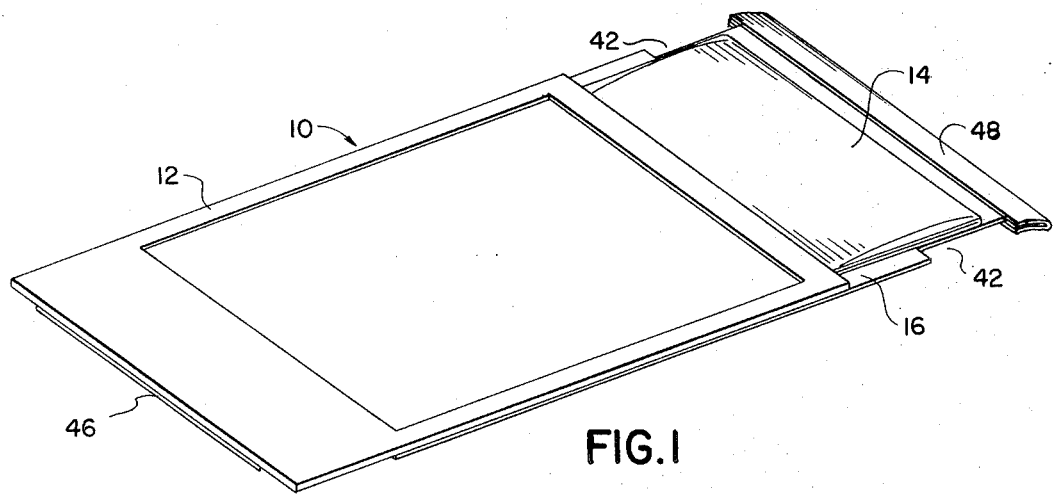
FIG. 1 is a perspective view of a self-processing film unit incorporating a preferred embodiment of the present invention.

Because photographic cameras and film units of the self-processing type are well known, the present description will be directed in particular to elements forming part of or cooperating more directly with the present invention. Camera and film elements not specifically shown or described herein are selectable from those known in the prior art.

The preferred film unit 10, illustrated in FIGS. 1–9 of the accompanying drawings, comprises an image-recording section 12, a container or pod 14 of processing fluid, and a carrier 16, to which the section 12 is releasably coupled and the container 14 is permanently attached.

Figure 2:
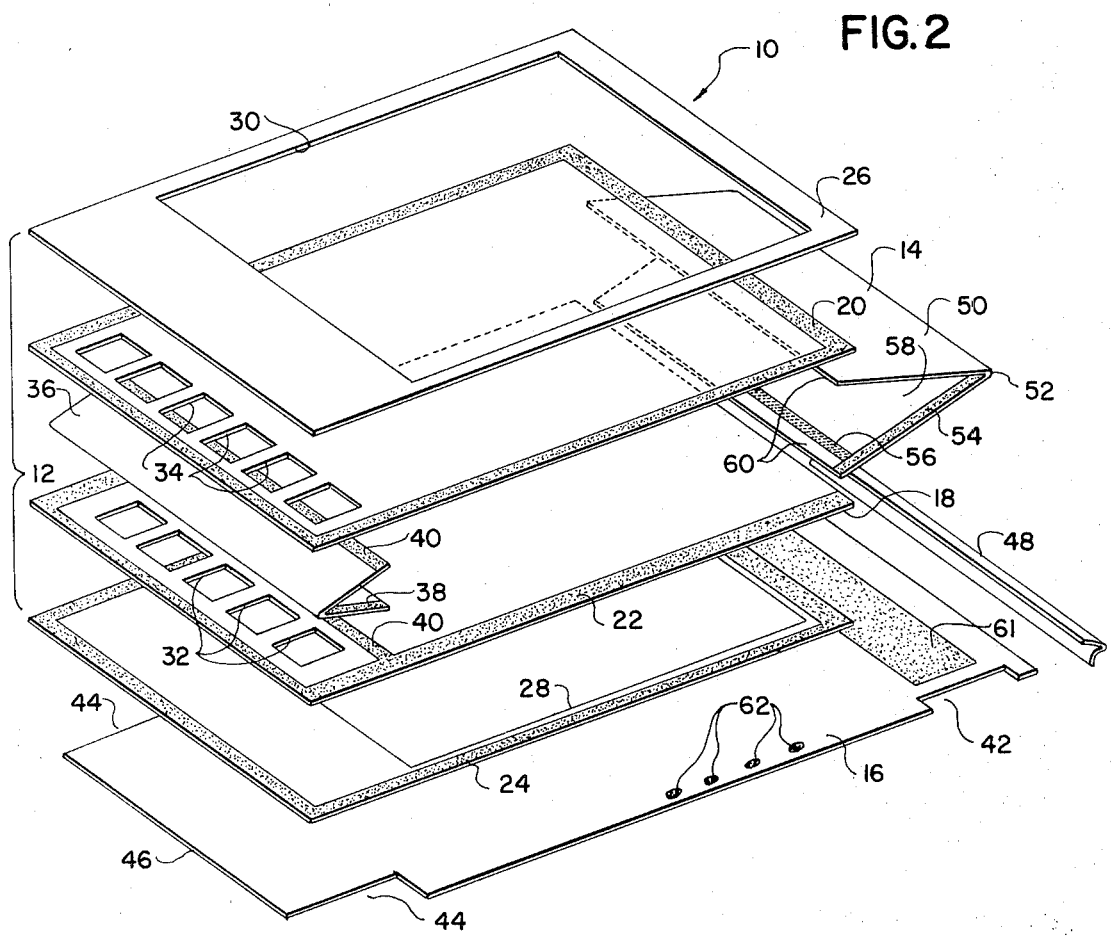
FIG. 2 is an exploded view of the film unit shown in FIG. 1.
Figure 8:
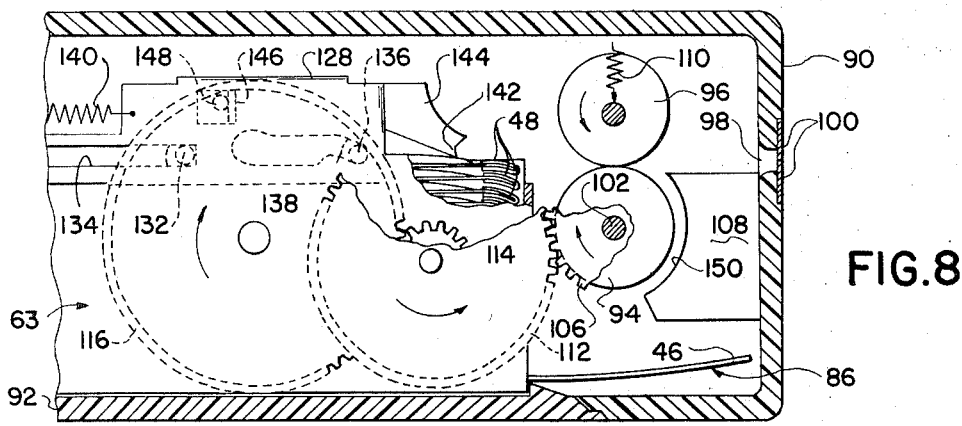
FIG. 8 is a partially cross-sectioned side elevational view of a portion of a structure depicted in FIG. 7.

As best illustrated in FIG. 2, the image-recording section is of the preregistered integral type, comprising a photosensitive sheet 18, and a transparent cover or process sheet 20 that is permanently attached to the photosensitive sheet along its lateral and trailing edges, as shown by the shaded areas 22 in that figure. For purposes of clarity permanent connections between the different elements of the film unit are depicted by areas shaded with dots and separable connections are illustrated by areas shaded with dashes. Mask sheets 24 and 26 are permanently bonded to the corresponding outer faces of the photosensitive and process sheets and include respective openings 28 and 30 that define the image or picture area of the image-recording section. The trailing end portions of the two sheets 18 and 20 are provided with respective rectangular openings 32 and 34 that are staggered relative to each other so that each opening 32 straddles the separating bar between two of the confronting openings 34. A very thin sheet of moisture resistant material 36 is folded and cemented to itself along its lateral edges 38 and is bonded to the confronting surfaces of the photosensitive and process sheets along its leading edges as shown by bonding areas 40. Sheet 36 thus forms an envelope that is open at its leading end to receive excess processing fluid driven beyond the picture area during the processing operation. Because the envelope provided by sheet 36 lies between the opposed openings in the two sheets 18 and 20, the envelope can expand slightly into those openings to accommodate the excess processing fluid. The staggered alignment of openings 32 and 34 tends to prevent the fluid from being squeezed out of the trap by accidental finger pressure. This particular type of trap is disclosed in greater detail in commonly assigned U.S. Patent Application Ser. No. 178,046 entitled Fluid Receiving Means filed on Sept. 7, 1971 in the name of Donald M. Harvey, now Pat. No. 3,751,256.

The carrier sheet 16 of the film unit is made of thin resilient plastic, such as a .005 inch sheet of polyester film base material, and is substantially the same width as the image-recording section. At its leading end, sheet 16 is provided with lateral notches 42 that straddle pod 14 and at its trailing end another pair of lateral notches 44 define a trailing tongue 46 overlapped by the trap portion of the image-recording section. The diverter bar 48, which comprises the most distinctive feature of the invention, is permanently attached to the leading end of the carrier sheet and preferably extends approximately .150 inches in the longitudinal direction toward the trailing end of the film unit. The bar has a curved profile to cause the pressure members to divert the leading end of the film unit rearwardly as explained in detail below. By way of example, the bar might be bent into an arcuate configuration having a .375 inch diameter when intended for use with .375 inch diameter pressure-applying rollers. Additionally, the diverter bar is the same transverse width as, or is wider than, the image-recording section. In the embodiments illustrated herein, the diverter bar is made of thin sheet metal and is crimped over the leading edge of the corresponding carrier sheet, but similar bars could comprise injection molded or extruded plastic parts cemented to the carrier sheet or formed as an integral part of that sheet.

The two sheets 18 and 20 of the image-recording section are rectangular and coextensive with one another and are permanently joined along their margins, as previously mentioned, whereby their central exposure regions are maintained in registration but are resiliently separable to permit the distribution of a processing composition or fluid therebetween. The photosensitive sheet is exposed through the transparent process sheet and, after processing, the image-recording section is viewed from the opposite side, thus providing a positive right-reading image without the necessity of recourse to image-reversing mirrors or the like in the camera.

The container or pod 14 that initially contains the processing fluid composition is permanently cemented to the carrier sheet 16 between the leading end of the image-recording section and the diverter bar 48 and is straddled by lateral notches 42 adjacent the leading end of the carrier sheet. As best depicted in FIG. 2, the processing fluid pod comprises a single sheet 50 of a tough vapor impervious laminate that is chemically inert to the relatively caustic processing fluid, representative examples of which are disclosed in a number of patent references well known to those skilled in the art of self-processing cameras. Typically, the pod sheet 50 comprises a web of paper or plastic laminated to a thin layer of lead foil. Sheet 50 is folded along one edge as shown at numeral 52 and is sealed along its lateral margins 54 by a permanent cement or adhesive or by means of an appropriate heat sealing operation or the equivalent. A rupturable or separable transverse joint or seal 56 extends between the permanently sealed margins 54 of sheet 50, thus defining a rupturable separation between the processing fluid chamber 58 and the funnel portion 60 of the pod. The pod funnel 60, in turn, is inserted between the leading edges of the photosensitive and process sheets but is not cemented or otherwise mechanically attached to the image-recording section. The pod is permanently bonded to the carrier sheet by an adhesive 61 while the image-recording section is separably attached to the carrier sheet by a series of spots of rupturable adhesive material 62. When the processing fluid pod passes through the nip between two opposed pressure members in the camera, the resulting hydraulic forces developed within chamber 58 cause joint 56 to rupture so that the processing fluid is delivered between the two sheets of the image-recording section through funnel 60 and is distributed across the exposed image on the photosensitive sheet. As previously described, excess processing fluid driven beyond the exposed image is collected in the envelope or chamber provided by trap sheet 36.

A plurality of film units of the type described above are supplied in a film pack or magazine 63, best illustrated in FIG. 6. The casing 64 of the film pack is made of plastic and/or sheet metal and includes a forward or film compartment 66 and a rearward or storage compartment 68. The film units 10 are initially housed in the film compartment 66 in stacked relation relative to each other. A pressure plate 70 is located rearwardly of the film units in the film compartment and is urged forwardly by a resilient leaf spring 72 to compress the stack of film units lightly against the forward wall 74 of the casing, which is provided with an exposure opening or window 76. The forward edge 78 of the film compartment end wall 80 is located slightly rearwardly of the plane defined by the rearward edge of the forwardmost diverter bar and the forward casing wall terminates beyond wall 80 to provide an access opening 82 through which a feeder mechanism can engage the ends of the accessible diverter bar. To maintain the film units in stacked alignment, the film compartment conforms to the width of the image-recording section and the carrier sheets. Behind casing end wall 80, the storage compartment 68 is provided with an end opening 84 through which excess elements of the processed film units are delivered into the storage compartment. Initially, an opaque cover sheet 86 is located forwardly of the forwardmost film unit to protect that unit from ambient light. This cover sheet is substantially identical to the film units except that no pod or sensitized material is provided on its carrier sheet 88. Because the cover sheet is removed from its initial position and delivered into the storage compartment by the same means employed to process the subsequent film units, it is shown in its initial position only in FIGS. 5–7 and is depicted in the storage compartment in FIGS. 8–11.

The housing of the camera is partially depicted at numeral 90 in FIGS. 8–11 and is provided with a hinged rearward cover door 92 that can be opened to permit insertion of the film pack into the housing. In its illustrated loaded position, the film pack is engaged by appropriate support surfaces of the housing, not shown, which locate the exposure surface of the forward-most image-recording section in accurate coincidence with the focal plane of the camera lens. After the film pack has been loaded into the camera and the cover sheet has been removed from the film compartment, the leading end of the film unit in exposure position is located in endwise alignment with the processing nip between two processing members which are depicted as comprising a rearward or drive roller 94 and a forward roller 96. The roller nip, in turn, is aligned with slot 98 in the camera housing, which is covered by a pair of resilient light excluding flaps 100.

The rearward processing roller 94 is rotatably supported in fixed relation relative to the camera housing by its central shaft 102, which is coupled directly to a battery operated drive motor 104 and provided with a pinion 106. A pair of guide shoes 108, rigidly supported by the camera housing, partially encircle the rearward pressure roller to direct the cover sheet and the film units toward the pack storage compartment, as described below. The forward processing roller 96 is rotatably carried by an appropriate bracket or bearing structure, not shown, which is biased rearwardly by springs represented at numeral 110 to provide firm but resilient nip pressure between the two rollers.

Pinion 106 on the rearward roller shaft 102 is engaged with a large intermediate gear 112 rotatably supported to the camera housing and attached to a second pinion 114. The latter pinion, in turn, is meshed with a relatively large timing gear 116, which is likewise rotatably supported to the camera housing. The illustrated timing gear carries a switch actuating pin 118 that engages the flexible leaf 120 of a normally closed switch 122 in series with motor 104 and battery 124. Timing gear 116 initially is in the position shown in FIG. 7, until a film processing operation is initiated, and pin 118 holds switch 122 open so that motor 104 remains de-energized. A normally open switch 126 wired in parallel with switch 122 is adapted to be closed momentarily by the return stroke of the shutter release member of the camera. This momentary closing of switch 126 energizes the motor to rotate the processing roller and the gear train. As soon as such rotation commences, pin 118 on gear 116 moves beyond leaf 120 of switch 122, which is thereby closed to allow the motor to continue running until gear 116 has made a complete single revolution so that pin 118 again opens switch 122. Because of the gear ratio between timing gear 116 and pinion 106, each complete revolution of the timing gear allows the drive roller to revolve a sufficient number of times to engage a film unit and drive it completely through the roller nip. The supplemental feeder or shuttle member 128 is slidably supported relative to plates 130 of the camera housing by a pair of opposed pins 132 received in elongate slots 134 and by a second set of opposed pins 136 received in specially profiled guide slots 138. A pair of coil springs 140 bias the shuttle member toward its retracted position shown in FIGS. 7 and 8. In this position, notches 142 at the ends of the shuttle member fingers 144 are located slightly forward of the lateral notches 42 in the carrier sheet of the forwardmost cover sheet or film unit. An ear 146 on the shuttle member is located in the path of movement of a drive pin 148 carried by the timing gear 116. Preferably, gears 106, 112, 114 and 116 are duplicated at the opposite side of the film pack and a similar ear on that side of the shuttle member engages a corresponding driving pin on the opposite timing gear.

Figure 9:
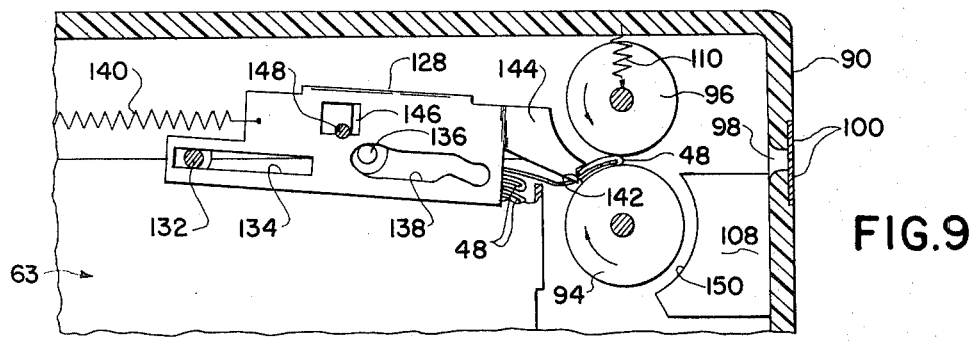
FIGS. 9–11 correspond to a portion of FIG. 8 and show progressive stages of the movement of a film unit into and through the pressure nip defined by the processing members of the camera.

When the motor is energized, the resulting rotation of the timing gears causes pins 148 to engage the shuttle member ears 146 and to drive the shuttle member toward the processing rollers. As this movement commences, the shape of slots 138 causes the teeth of the shuttle member to move rearwardly so that the rearward edge of the forwardmost diverter bar 48 is engaged by notches 142 in the shuttle fingers. Further movement of the shuttle member then delivers the leading edge of the diverter bar to the processing nip between the two rollers and forces the diverter bar into that nip as shown in progressive stages in FIGS. 9 and 10. Because the radius of curvature of the rearward face of the diverter bar corresponds to the radius of the drive roller, the trailing edge of the diverter bar moves rearwardly as the bar starts to enter the nip. Accordingly, the profile of slots 138 accommodates corresponding rearward movement of the shuttle fingers, as shown in FIG. 9, to maintain those fingers in engagement with the bar. This rearward movement of the fingers is also facilitated by the angular relation between the movement of the driving pins 148, the position of springs 140 and the location of pins 132 and slots 134. After the diverter bar has been fed entirely into the nip, as shown in solid lines in FIG. 10, pins 148 have moved beyond engagement with ears 146 so that springs 140 immediately return the shuttle member to its initial position. During this return movement, the angularity of springs 140 relative to pins 132 and 136 exerts a forward influence on fingers 144 so that the fingers follow a return movement path defined by slots 138.

Figure 10:
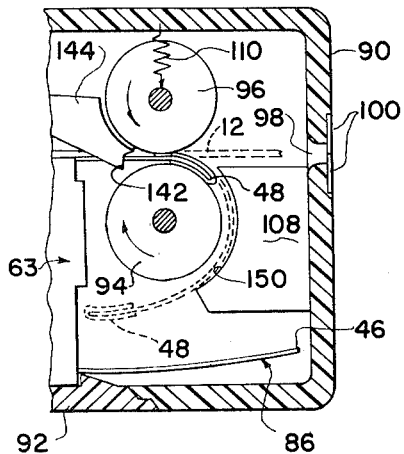
Figure 11:
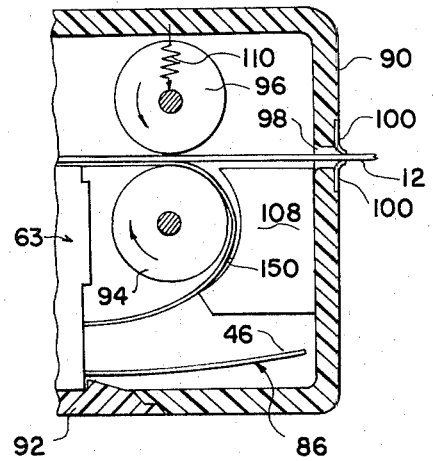

Because of the curvature of the diverter bar, the nip pressure maintains it in contact with the drive roller as long as the bar is received in the pressure nip. Accordingly, as shown in FIG. 10, by the time the bar has been driven beyond the pressure nip, its leading end is received in the space between the drive roller and the arcuate faces 150 of guide shoes or fenders 108, which are located entirely behind the plane defined by the roller nip and the housing slot 98. As depicted in broken lines in FIG. 10, the continuing movement of the drive roller therefore directs the leading end of the film unit partially around that roller and into the film pack storage compartment as the processing fluid pod is simultaneously ruptured and the processing fluid is extruded between the two sheets of the image section. When the leading edge of the image-recording section emerges through the roller nip, as shown in FIG. 11, its inherent stiffness causes it to continue moving in a flat plane forwardly of the guide shoes and to separate from the trailing end of the pod permanently attached to the carrier sheet. As the adhesive connections 62 between the image-recording section and the carrier sheet pass through the roller nip, those connections are ruptured, but the frictional engagement between the image-recording section and the carrier sheet causes them to continue to move together through the roller nip as the recording section emerges through housing slot 98 and the carrier sheet continues to be driven around drive roller 94. When the diverter bar of the film unit has moved halfway around the driving roller, the guide shoes 108 direct it tangentially into the storage compartment opening 84 of the film pack casing so that the continuing rotation of the rollers pushes the waste elements of the film unit into that compartment as the leading edge of the recording section emerges from the camera.

The tongue 46 at the trailing end of carrier sheet 16 is narrower than the space between the two guide shoes 108. Therefore, when the trailing end of the film unit has been driven beyond engagement with the two rollers and the recording section has been withdrawn from the camera, the inherent resiliency of the carrier sheet causes tongue 46 to assume a generally flat position between the guide shoes as shown by the tongue of the cover sheet in FIGS. 8, 10 and 11. Consequently, the carrier sheet is beyond the path of movement of the subsequent diverter bar, which is delivered into the storage compartment forwardly of the preceding sheets. After all of the available film units have been processed and the film pack has been removed from the camera, the trailing ends of the carriers can be pushed manually all the way into the storage compartment or an auxiliary device can be incorporated with the illustrated camera mechanism to perform that function.

Figure 12:
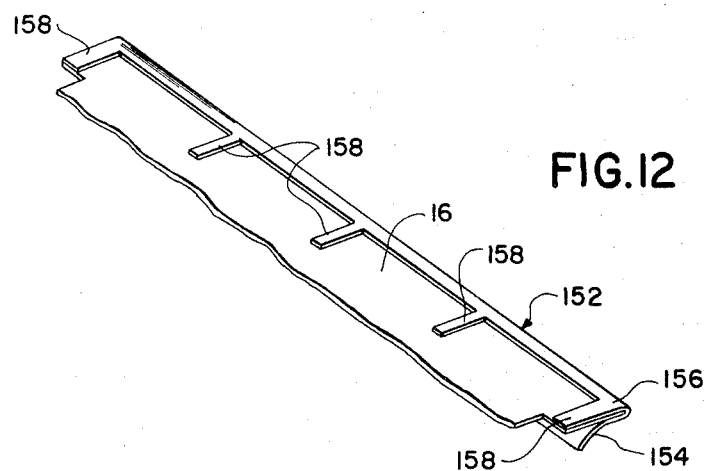
FIG. 12 is a perspective view of a diverter bar according to an alternate embodiment of the invention.
Figure 13:
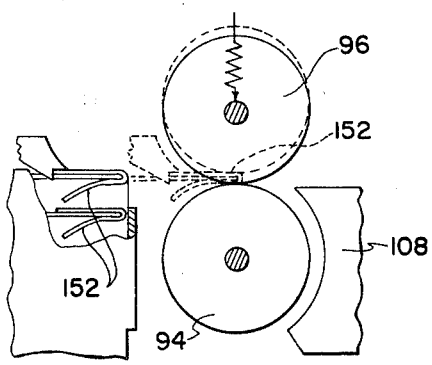
FIGS. 13 and 14 are similar to FIGS. 9 and 10 but illustrate the performance of the type of diverter bar depicted in FIG. 12.
Figure 14:
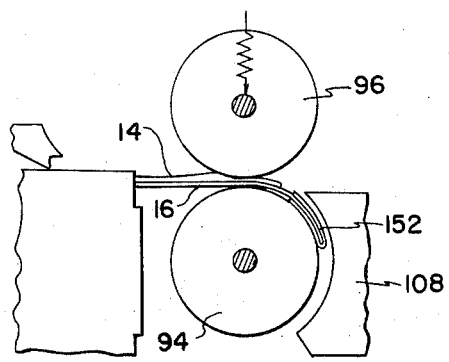

The embodiment of the invention shown in FIGS. 12–14 comprises a diverter bar 152 that performs in basically the same manner described above by virtue of a curved profile that causes the bar to remain in contact with the drive roller as it passes through the roller nip. In accordance with this embodiment, the lower lip 154 of the diverter bar at one surface of the carrier is permanently curved to subtend an arc of at least about 20 degrees for conforming to the drive roller curvature but the upper bar lip 156 at the other surface of the carrier comprises a plurality of narrow tabs or fingers that initially lie in a flat plane adjacent the front surface of the carrier sheet 16. Because only a very short portion of the leading edge of the carrier sheet can be crimped initially between the two diverter bar lips, the upper lip ears are preferably cemented to the carrier sheet to insure against separation of the bar from that sheet. As shown in FIG. 13, the initial profile of such diverter bars facilitates feeding the bars into the nip by causing them to lie in flat stacked relation to each other. Additionally, by eliminating the initial rearward movement of the trailing edge of the bar as it enters the roller nip, this bar configuration simplifies the construction of the means by which the movement path of the shuttle member is established. After the diverter bar has been received in the roller nip, the driving action of the rollers causes tabs 158 to bend rearwardly in conformity with the curvature of the much stiffer rearward bar lip 154 as shown in FIG. 14; whereupon the bar performs in exactly the same manner previously described and occupies a minimum amount of space in the film storage compartment.

Although the subject diverter bar construction has been illustrated in conjunction with a specific type of film unit, it should be apparent that the invention is also applicable to other types of film units including those having separable traps attached to their carrier sheets or shortened carrier sheets that do not extend the full length of the film unit.

The invention has been described in detail with particular reference to a preferred embodiment thereof, but it will be understood that variations and modifications can be effected within the spirit and scope of the invention.

We claim:
1. In a self-processing photographic film unit for use in a processing camera of a type including a pair of juxtaposed pressure-applying members for engaging and applying compressive pressure to said film unit to effect processing of said film unit, at least one of the members being generally cylindrical and rotatably driveable in engagement with said film unit for transporting said film unit between the members in a first direction generally tangential to the one member at a point between the members;
    said film unit comprising an image-recording section for recording a photographically useful image and a leading section having a leading edge; the improvement comprising
    a leading edge stiffening means having at least one face with an arcuate form whereby the stiffening means follows an arcuate path conforming to the surface of the one pressure-applying member and away from said first direction as said leading edge moves between the members.

2. A self-processing film unit as claimed in Claim 1, wherein said stiffening means comprises a substantially rigid element which is curved longitudinally.

3. A self-processing film unit as claimed in Claim 1, wherein said substantially rigid element has a radius of curvature substantially equal to the radius of said one pressure-applying member.

4. A self-processing film unit as claimed in Claim 1, wherein said film unit has a transverse dimension generally normal to said longitudinal direction, and said stiffening means comprises a long narrow bar extending transversely of said film unit adjacent said container.

5. A self-processing film unit as claimed in Claim 4, wherein said bar includes two generally parallel arcuate surfaces.

6. A self-processing film unit as claimed in Claim 4, wherein said bar includes one substantially flat surface and one arcuate surface, said arcuate surface defining said face with an arcuate form.

7. A film unit as claimed in Claim 6, wherein said bar includes a substantially flat leading end defined by said one flat surface and another generally parallel flat surface aligned with said one flat surface in juxtaposed relationship therewith, and wherein said arcuate surface is spaced from said parallel flat surfaces in said longitudinal direction.

8. A self-processing film unit as claimed in Claim 4, wherein said image-recording section has a transverse dimension, and said bar has a transverse dimension not greater than said transverse dimension of said image-recording section.

9. A self-processing film as claimed in Claim 1, wherein the stiffening means is folded over the leading edge of the leading section.

References Cited
UNITED STATES PATENTS 3,636,845   1/1972   Harvey _____ 96—76 C
3,680,456   8/1972   Nerwin _____ 96—76 R RONALD H. SMITH, Primary Examiner
J. L. GOODROW, Assistant Examiner U.S. Cl. X.R.
96—29

PO-1050
(5/69)

UNITED STATES PATENT OFFICE
CERTIFICATE OF CORRECTION

Patent No. 3,826,655               Dated July 30, 1974

Inventor(s) Robert J. Borel, James C. Foote, Jr. and Horace G. Warren

It is certified that error appears in the above-identified patent and that said Letters Patent are hereby corrected as shown below:

Column 5, line 63, delete "large" and insert --larger--; and

Column 8, line 31, delete "1" and insert --2--.

Signed and sealed this 8th day of October 1974.

(SEAL)
Attest:

McCOY M. GIBSON JR.            C. MARSHALL DANN
Attesting Officer              Commissioner of Patents